United States Patent
Matsuse et al.

(10) Patent No.: US 7,475,182 B2
(45) Date of Patent: Jan. 6, 2009

(54) SYSTEM-ON-A-CHIP MIXED BUS ARCHITECTURE

(75) Inventors: Shuhsaku Matsuse, Kusatsu (JP); Makoto Ueda, Kyoto (JP)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 11/295,117

(22) Filed: Dec. 6, 2005

(65) Prior Publication Data

US 2007/0130409 A1    Jun. 7, 2007

(51) Int. Cl.
G06F 13/16    (2006.01)
G06F 13/28    (2006.01)
G06F 13/00    (2006.01)
G06F 15/76    (2006.01)

(52) U.S. Cl. .......................... 710/308; 710/21; 710/27; 710/37; 711/150; 711/168; 712/33

(58) Field of Classification Search .................. 710/308, 710/315, 21, 27, 37; 711/150, 168; 712/33
See application file for complete search history.

(56) References Cited

U.S. PATENT DOCUMENTS

| 5,621,902 A * | 4/1997 | Cases et al. ................. 710/308 |
| 6,996,651 B2* | 2/2006 | Garinger et al. ............. 710/305 |
| 2005/0021871 A1* | 1/2005 | Georgiou et al. ............ 709/250 |

* cited by examiner

*Primary Examiner*—Mark Rinehart
*Assistant Examiner*—Jeremy S Cerullo
(74) *Attorney, Agent, or Firm*—Lieberman & Brandsdorfer, LLC

(57) ABSTRACT

A mixed architecture system on chip is provided by combining a CoreConnect system on chip architecture with an AMBA system on chip architecture. To eliminate data transfer and bus error that could occur in the mixed architecture, an additional peripheral bus and bridge are provided to manage communication with AHB resources.

11 Claims, 4 Drawing Sheets

SYSTEM-ON-A-CHIP MIXED BUS ARCHITECTURE

BACKGROUND OF THE INVENTION

1. Technical Field

This invention relates to system on chip architectures. More specifically, this invention relates to combining the CoreConnect architecture with the AMBA architecture.

2. Description of the Prior Art

Core Connect bus architecture owned by IBM is a standard System-On-a-Chip (SoC) design that allows peripherals formerly attached to the processor at the card level to be integrated onto the same die as the processor. The Core Connect architecture provides the following three buses for interconnecting core, library macros, and custom logic: processor local bus (PLB), on-chip peripheral bus (OPB), and device control register (DCR). The PLB and OPB buses provide the primary means for data flow among macro elements. The PLB generally interconnects high-bandwidth devices, such as processor cores, external memory interfaces, and DMA controllers. The PLB addresses the high performance, low latency and design flexibility issues with peripherals. The PLB supports interconnection with various master and slave macros. Each PLB master is attached to the PLB macro via separate addresses, read data and write data buses, and a plurality of transfer qualifier signals. PLB slaves are attached to the PLB macro via shared, but decoupled address, read data and write data buses along with transfer control and status signals for each data bus. The PLB architecture supports up to 16 master devices. The PLB architecture also supports any number of slave devices. The number of masters and slaves attached to a PLB macro directly affects the maximum attainable PLB bus clock rate.

PLB transactions consist of multiphase address and data tenures. Depending on the level of bus activity and capabilities of the PLB slaves, these tenures may be one or more PLB bus cycles in duration. In addition, address pipelining and separate read and write data buses yield increased bus throughput by way of concurrent tenures. Address tenures have three phases: request, transfer, and address acknowledge. A PLB transaction begins when a master drives its address and transfer qualifier signals and requests ownership of the bus during the request phase of the address tenure. Once the PLB arbiter grants bus ownership, the master's address and transfer qualifier are presented to the slave devices during the transfer phase. The address cycle terminates when a slave latches the master's address and transfer qualifiers during the address acknowledge phase.

AMBA, the Advanced Microprocessor Bus Architecture is an open standard on-chip bus specification that details a strategy for the interconnection and management of functional blocks that makes up a SoC. AMBA defines a multilevel busing system, with a system bus and a lower-level peripheral bus. These include two system buses: an AMBA High-Speed Bus (AHB) or an Advanced System Bus (ASB), and an Advanced Peripheral Bus (APB). The two buses are linked via a bridge that serves as the master to the peripheral bus slave devices and helps reduce system power consumption.

The CoreConnect architecture shares many similarities with the AMBA. For example, both architectures support data bus widths of 32 bits and higher, utilize separate read and write data paths, and allow multiple masters. CoreConnect and AMBA both provide high performance features including pipelining, split transactions, and burst transfers.

It is known in the art to implement the CoreConnect bus architecture and the AMBA bus architecture into a single mixed architecture. Due to the dissimilarity of these two bus architectures, a bridge has been used to carry out protocol conversion between the two bus architectures. FIG. 1 is an overview of a prior art bus architecture (10) used by existing technology to arbitrate data communications when the CoreConnect and AMBA are mixed. As shown, a bridge (50) is used to carry out protocol conversion between the two bus architectures. The processor local bus (PLB) (22) of the CoreConnect architecture (20) and AHB (32) of the AMBA architecture (30) are connected with the bridge (50). This bridge (50) includes two elements for data conversion. One element is a PLB2AHB bridge component (52) that converts a PLB master transfer into an AHB master transfer. Another element is an AHB2PLB bridge component (54) to convert an AHB master transfer into a PLB master transfer. However, since these two bus architectures are dissimilar, it is known that data transfer error problems occur. In one embodiment, the error takes the form of an increased number of read times for an AHB Slave than the number of reads of a corresponding DMAC. This results in a bus error.

Therefore, there is a need to connect the PLB of the CoreConnect architecture and AHB of the AMBA architecture with a solution that eliminates the bus error.

SUMMARY OF THE INVENTION

This invention comprises a method and system that mitigates bus error in a mixed system on chip architecture.

In one aspect of the invention, a method is provided for mixing system on chip architectures. A CoreConnect system on chip architecture is combined to form a single system with an AMBA system on chip architecture. A single processor local bus is maintained in the mixed chip architecture. An on-chip peripheral bus is divided into a first on-chip peripheral bus and a second on-chip peripheral bus. The first on-chip peripheral bus is interconnected with the single processor local bus, and the second on-chip peripheral bus is interconnected with the single processor local bus. A first DMA controller is assigned to the first on-chip peripheral bus, and a second DMA controller is assigned to the second on-chip peripheral bus. Communication of the second DMA controller is limited to resource of the AMBA system on-chip architecture.

In another aspect of the invention, a mixed system on chip architecture is provided. The mixed system is a single system on chip architecture having a CoreConnect system on chip architecture combined with an AMBA system on chip architecture. A single processor local bus is provided, together with a first on-chip peripheral bus and a second on-chip peripheral bus. The first on-chip peripheral bus is interconnected with the single processor local bus, and the second on-chip peripheral bus is interconnected with the single processor local bus. In addition, a first DMA controller is assigned to the first on-chip peripheral bus, and a second DMA controller is assigned to the second on-chip peripheral bus. This mixed architecture enables a plurality of resources of the AMBA system on chip architecture to limited communication limited with the second DMA controller.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A CoreConnect system on chip architecture is mixed with an AMBA system on chip architecture. The mixed architecture includes a circuit with an additional on-chip peripheral bus and two additional bridges. The addition of the circuit to the mixed architecture removes a bus error that sometimes occurs with the transfer of data between the processor local bus and an advanced high performance bus of the AMBA SoC architecture.

Technical Details

Figure 1:
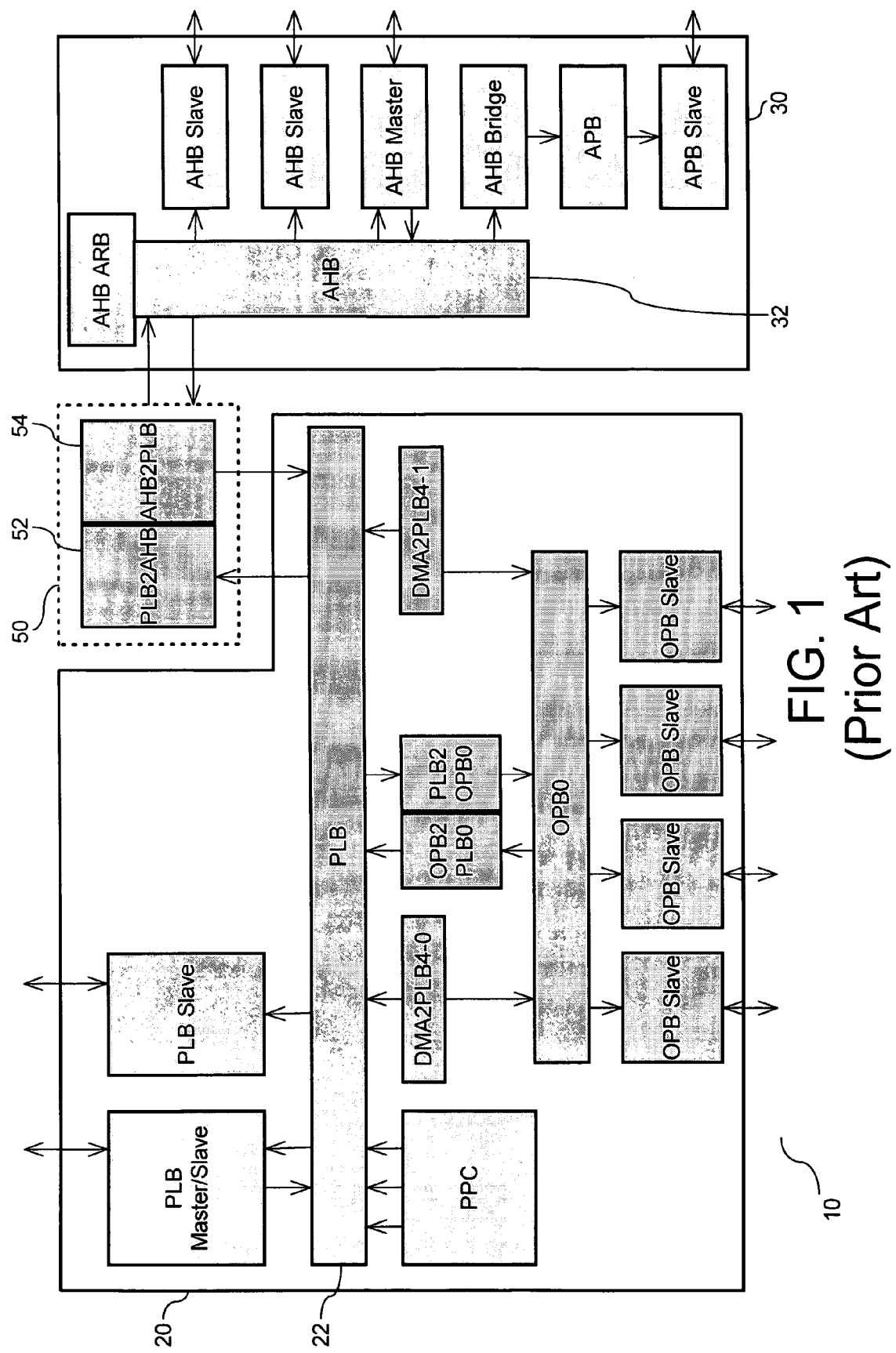
FIG. 1 is a block diagram of a prior art mixed architecture combining a Core Connect system with an AMBA system.
Figure 2:
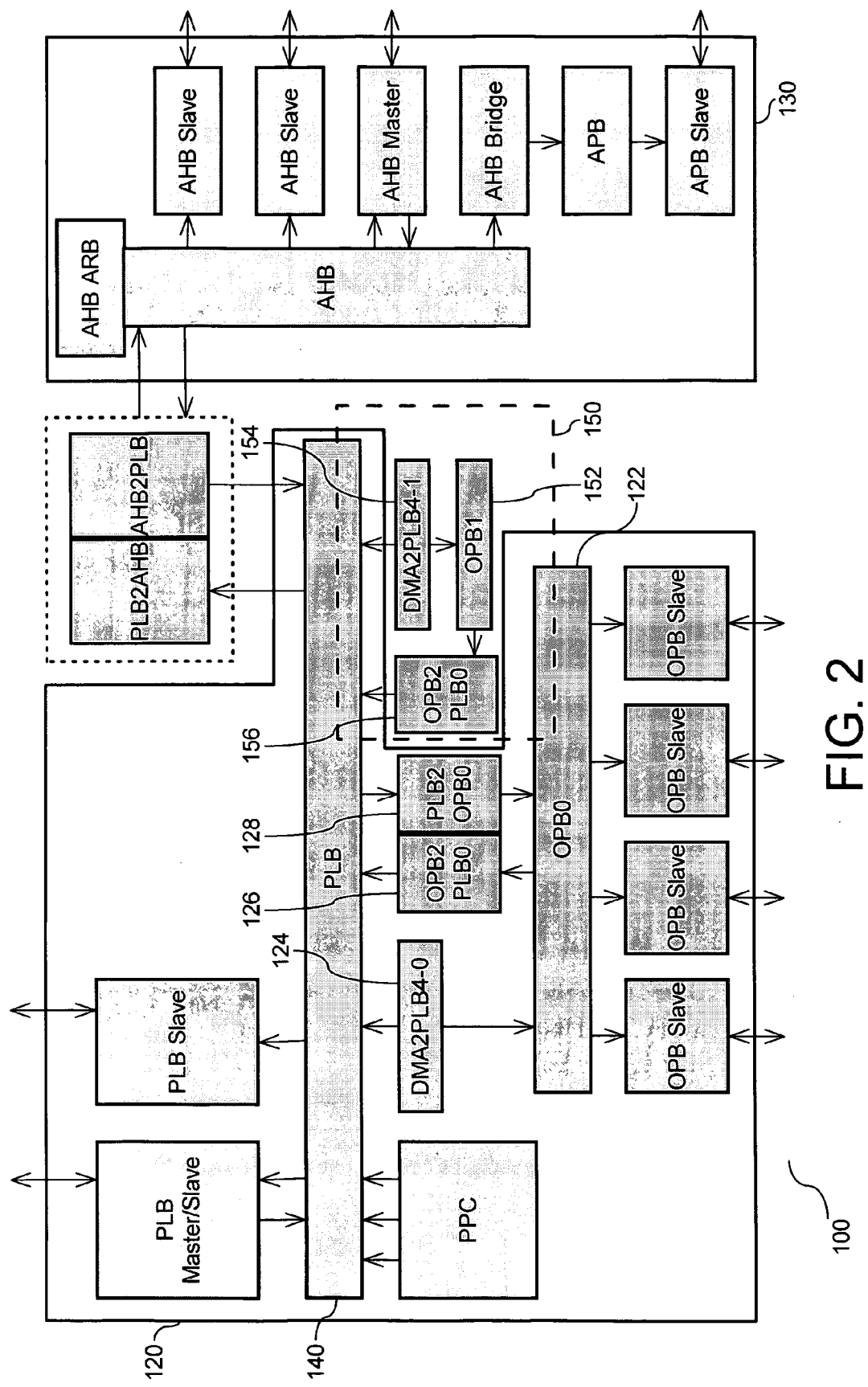
FIG. 2 is a block diagram of a mixed architecture combining a CoreConnect system with an AMBA system according to the preferred embodiment of this invention, and is suggested for printing on the first page of the issued patent.

FIG. 2 is a schematic diagram (100) of a bus architecture mixing the CoreConnect architecture (120) with the AMBA architecture (130) and showing a solution to the bus error. As shown, a circuit (150) is provided joining the two architectures. The circuit (150) includes an additional OPB bus (152) to the CoreConnect OPB bus (122). For reference purposes only, the CoreConnect OPB Bus (122) is referred to as a first OPB Bus, and it resides external to the circuit (150). The additional OPB Bus (152) is referred to as a second OPB Bus for reference purposes only, and the second OPB Bus (152) resides within the circuit (150). In addition, as shown there are DMA2PLB bus bridges (124) and (154). The first DMA2PLB bus bridge (124) continues to reside external to the circuit and joins the first OPB Bus (122) with the PLB (140). A second DMA2PLB Bridge (154) resides within the circuit (150) to join the second OPB Bus (152) with the PLB (140). Also, as shown in the prior art, there are an additional two bridges (126) and (128) for serving as the master to the peripheral bus slave devices which help reduce system power consumption. A first of the two additional bridges is an OPB2PLB bridge (126), and a second of the two bridges is a PLB2OPB bridge (128). In addition, as shown, a third OPB2PLB bridge (156) is added to the architecture within the circuit (150). The third OPB2PLB bridge (156) joins the second OPB Bus (152) with the PLB (140). The remaining elements of the mixed CoreConnect SoC architecture and the AMBA SoC architecture remain the same.

Figure 3:
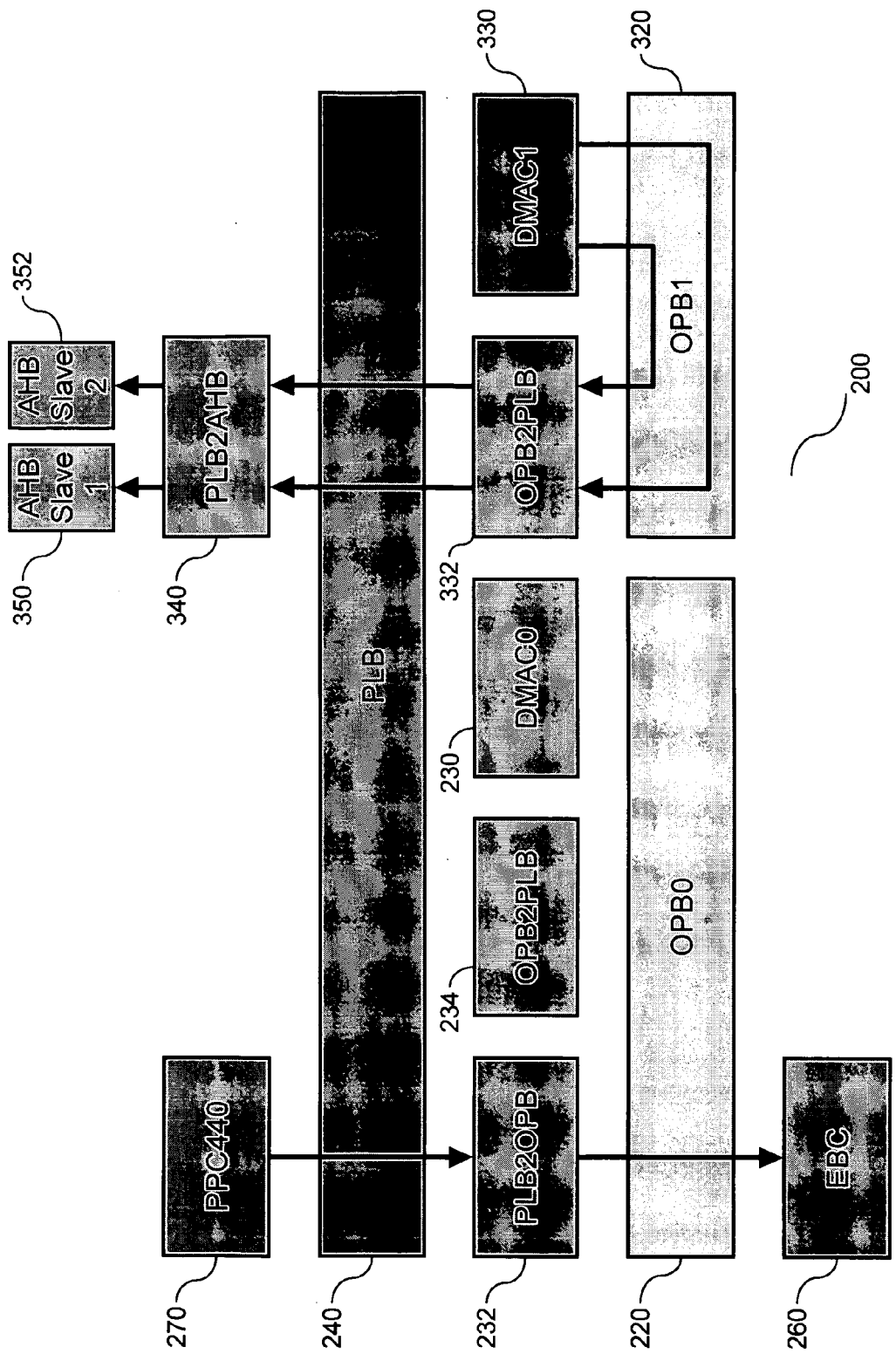
FIG. 3 is a block diagram of an embodiment of the mixed architecture.

FIG. 3 is a schematic diagram (200) of a portion of the joined bus architecture of FIG. 2. As shown, there is a divided OPB bus. The first OPB bus (220) is in communication with a PLB (240). To facilitate communication between an external bus controller (260) and a processor (270), the following elements are provided in communication with the first OPB bus (220) and the PLB (240): a first direct memory access controller (230) (DMAC), a PLB2OPB bridge (232), and a OPB2PLB bridge (234). The first DMAC (230) is allocated to the External Bus Controller (EBC) (260). The second OPB bus (320) is in communication with AHB resources (350) and (352), also known as slaves, through the PLB (240). To facilitate the communication with AHB resources, a second direct memory access controller (330), an OPB2PLB bridge (332) and a PLB2AHB bridge (340) are provided. The second DMAC (330) is allocated to only AHB resources (350) and (352).

Figure 4:
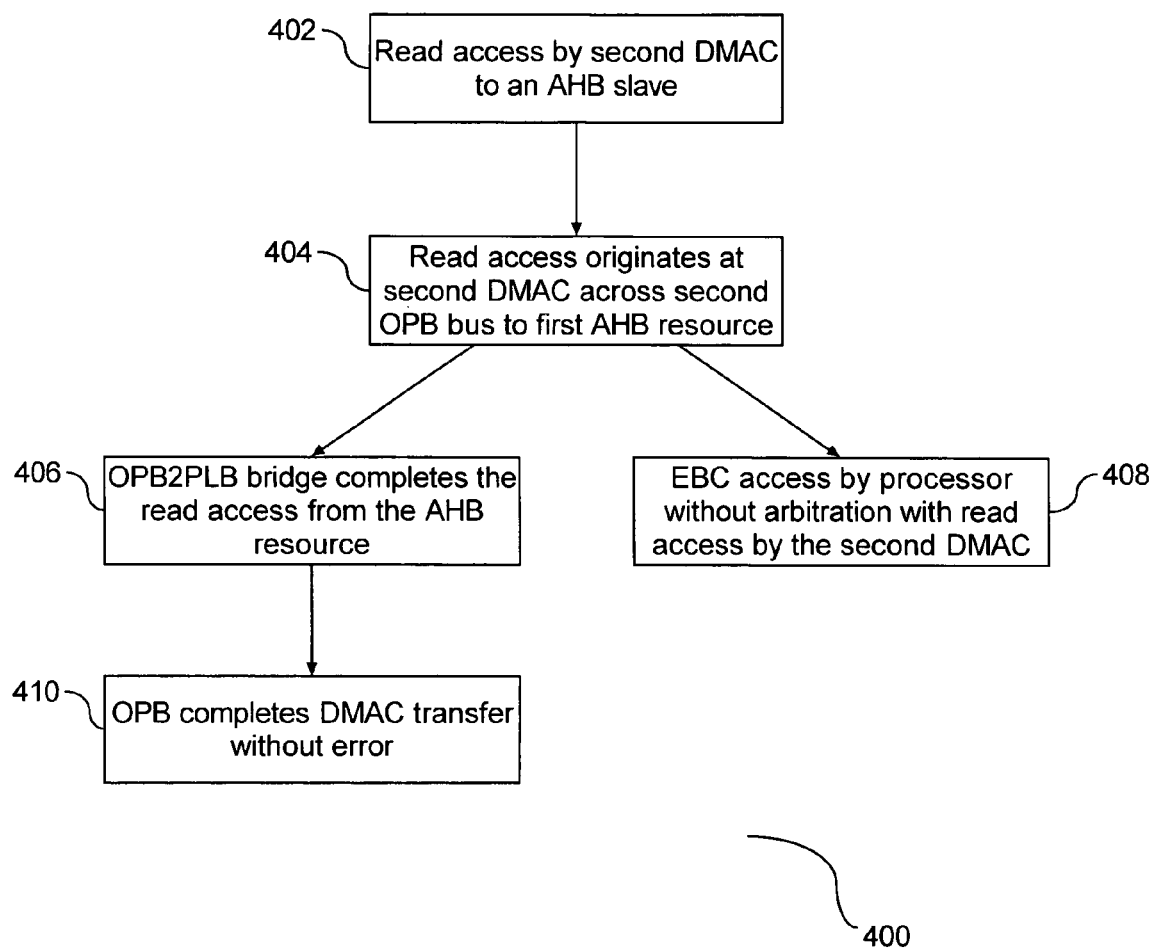
FIG. 4 is a flow chart illustrating command flow of the mixed architecture.

FIG. 4 is a flow chart (400) illustrating the flow of commands in the modified bus architecture of FIG. 3. At an initial step, a read access (402) to one of the AHB slaves is made by the second DMAC. The read access communication originates at the second DMAC across the second OPB bus to the first AHB resource (404). The OPB2PLB bridge completes the read access from the AHB resource (406). At the same time, an EBC access by the processor can occur (408) without a need to arbitrate with the read access by the second DMAC. In the prior art system without the additional circuit, a bus error would occur when the DMAC accesses to two AHB slaves simultaneously. The error would require the PLB2OPB bridge (232) to issue a retry signal to complete the PLB read and buffer read from the AHB resource. However, with the modification shown in FIGS. 2 and 3, the OPB can complete the DMAC transfer (410) without the bus error. Accordingly, there is no need for the PLB2OPB bridge to conduct a retry signal to complete the PLB read and buffer read from the AHB resource.

Advantages Over The Prior Art

A bridge is provided to arbitrate data communications with a mixed CoreConnect and AMBA SoC architecture. To avoid a data error caused by a bus error when transferring data between the PLB and the AHB, a circuit is provided in the architecture. The circuit has two additional elements: a separate on chip peripheral bus and an OPB2PLB bridge. The DMA2PLB bridge from the prior art is also placed within the circuit. In addition, a first DMA controller is assigned to the CoreConnect system and a second DMA controller is assigned to the AHB system. Communication of the second DMA controller is limited to the resources of the AMBA system. This circuit and the additional elements associated therewith removes the bus errors associated with data in the mixed system architecture.

ALTERNATIVE EMBODIMENTS

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for mixing system on chip bus architectures, comprising the steps of:

combining a CoreConnect system on chip architecture and an advanced microprocessor bus architecture (AMBA) system on-chip architecture into a single architecture;

maintaining a single processor local bus;

dividing an on-chip peripheral bus into a first on-chip peripheral bus and a second on-chip peripheral bus;

interconnecting said first on-chip peripheral bus with said single processor local bus, and interconnecting said second on-chip peripheral bus with said single processor local bus;

assigning a first DMA controller to said first on-chip peripheral bus;

assigning a second DMA controller to said second on-chip peripheral bus;

limiting communication of said second DMA controller to resources of said AMBA system on-chip architecture while allowing access of said first DMA controller to resources of said CoreConnect system; and performing a read access to an AMBA high-speed bus (AHB) slave by said second DMA controller across said second on-chip peripheral bus simultaneously with a processor access to an external bus controller, wherein no arbitration is required between said first and second on-chip peripheral bus with said read access by said second DMA controller.

2. The method of claim 1, wherein the step of limiting communication of said second DMA controller to resources of said AMBA system on-chip architecture includes allocating said second DMA controller to slave devices on said second on-chip peripheral bus.

3. The method of claim 1, further comprising limiting communication of said first DMA controller to resources of said CoreConnect on-chip architecture.

4. The method of claim 3, wherein the step of limiting communication of said first DMA controller to resources of said CoreConnect on-chip architecture includes allocating said first DMA controller to a processor and an external bus controller.

5. The method of claim 1, wherein the step of limiting communication of said second DMA controller to resources of said AMBA system on-chip architecture while allowing access of said first DMA controller to resources of said Core-Connect system includes supporting simultaneous communication from said second DMA controller to multiple AHB resources.

6. The method of claim 1, said second on-chip peripheral bus is connected with said single processor local bus by means of a circuit.

7. A system on chip architecture comprising:

a single system on chip architecture having CoreConnect system on chip architecture combined with an advanced microprocessor bus architecture (AMBA) system on chip architecture;

a single processor local bus;

a first on-chip peripheral bus and a second on-chip peripheral bus;

said first on-chip peripheral bus interconnected with said single processor local bus;

a circuit to connect said second on-chip peripheral bus with said single processor local bus;

a first DMA controller assigned to said first on-chip peripheral bus;

a second DMA controller assigned to said second on-chip peripheral bus;

a plurality of resources of said AMBA system on chip architecture having communication limited to said second DMA controller while a resource of said CoreConnect system having communication with said first DMA controller; and a read access to an AMBA high-speed bus (AHB) slave by said second DMA controller across said second on-chip peripheral bus simultaneous with a processor access to an external bus controller, without arbitration between said first and second on-chip peripheral bus with said read access by said second DMA controller.

8. The architecture of claim 7, wherein communication of said second DMA controller is limited to resources of said AMBA on-chip architecture.

9. The architecture of claim 7, wherein communication of said first DMA controller is limited to resources of said Core-Connect on-chip architecture.

10. The architecture of claim 9, further comprising a processor and an external bus controller in communication with said first DMA controller.

11. A method for mixing system on chip bus architectures, comprising the steps of:

combining a CoreConnect system on chip architecture and an advanced microprocessor bus architecture (AMBA) system on-chip architecture into a single architecture;

maintaining a single processor local bus;

dividing an on-chip peripheral bus into a first on-chip peripheral bus and a second on-chip peripheral bus;

interconnecting said first on-chip peripheral bus with said single processor local bus, and interconnecting said second on-chip peripheral bus with said single processor local bus by means of a circuit, wherein said circuit includes said second on-chip peripheral bus and a bridge;

assigning a first DMA controller to said first on-chip peripheral bus;

assigning a second DMA controller to said second on-chip peripheral bus; and performing a read access to an AMBA high-speed bus (AHB) slave by said second DMA controller across said second on-chip peripheral bus simultaneously with a processor access to an external bus controller without requiring arbitration between said first and second on-chip peripheral bus with said read access by said second DMA controller.

* * * * *